(12) United States Patent
Lee

(10) Patent No.: US 10,422,958 B2
(45) Date of Patent: Sep. 24, 2019

(54) HIGH-ORDER OPTICAL FIBER MULTI-WAVELENGTH FILTER, AND CONTINUOUS WAVELENGTH TUNING METHOD USING THE SAME

(71) Applicant: Pukyong National University Industry—University Cooperation Foundation, Busan (KR)

(72) Inventor: Yongwook Lee, Busan (KR)

(73) Assignee: Pukyong National University Industry—University Cooperation Foundation, Busan (KR)

( * ) Notice: Subject to any disclaimer, the term of this patent is extended or adjusted under 35 U.S.C. 154(b) by 0 days.

(21) Appl. No.: 15/950,171

(22) Filed: Apr. 11, 2018

(65) Prior Publication Data

US 2019/0258006 A1 Aug. 22, 2019

(30) Foreign Application Priority Data

Feb. 19, 2018 (KR) .................. 10-2018-0019590

(51) Int. Cl.
*G02B 6/293* (2006.01)
*G02B 6/27* (2006.01)

(52) U.S. Cl.
CPC ....... *G02B 6/29395* (2013.01); *G02B 6/2753* (2013.01); *G02B 6/29302* (2013.01); *G02B 6/29347* (2013.01); *G02B 6/2766* (2013.01)

(58) Field of Classification Search
None
See application file for complete search history.

(56) References Cited

U.S. PATENT DOCUMENTS

| 2006/0120656 A1* | 6/2006 | Han | G02B 6/274 385/11 |
| 2013/0230271 A1* | 9/2013 | Lee | G02B 6/00 385/12 |
| 2016/0004013 A1* | 1/2016 | Lee | G02B 6/29302 385/11 |

FOREIGN PATENT DOCUMENTS

KR 10-2009-0122783 A 12/2009

OTHER PUBLICATIONS

I. Yoon et al. Tunable multiwavelength fiber laser employing a comb filter based on a polarization-diversity loop configuration. Journal of Lightwave Technology, 24:4:1805-1811, Apr. 2006.*
S. Jo et al. Study on transmission and output polarization characteristics of a first-order Lyot-type fiber comb filter using polarization-diversity loop. IEEE Photonics Journal, 7:4:7801015, Aug. 2015.*

(Continued)

*Primary Examiner* — Michael Stahl
(74) *Attorney, Agent, or Firm* — Revolution IP, PLLC

(57) ABSTRACT

A high-order optical fiber multi-wavelength filter includes a polarization beam splitter configured to form a polarization-diversity loop configuration by splitting light received from a broadband light source into two polarization components, combining circulated and input light of the two polarization components, and outputting the combined light, a pair of polarization controllers each including at least one wave plate in combination, and configured to change a polarization state of input light, and a pair of polarization-maintaining fibers configured to form interference spectrums by assigning phase differences through birefringence.

6 Claims, 5 Drawing Sheets

(56) References Cited

OTHER PUBLICATIONS

Songhyun Jo, "Study on Transmission Spectra and Output Polarization Characteristics of Optical Fiber Multiwavelength Filter Based on Birefringence Combination", Interdisciplinary Program of Biomedical Mechanical & Electrical Engineering, the Graduate School, Pukyong National University, Feb. 2016, pp. 4-36.

* cited by examiner

[FIG. 1]
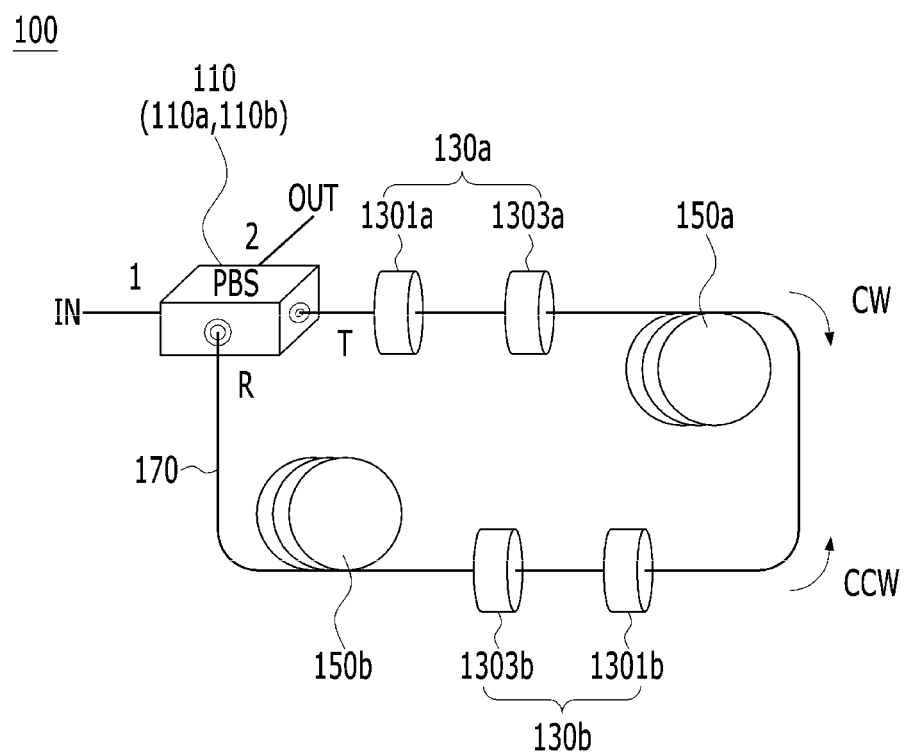

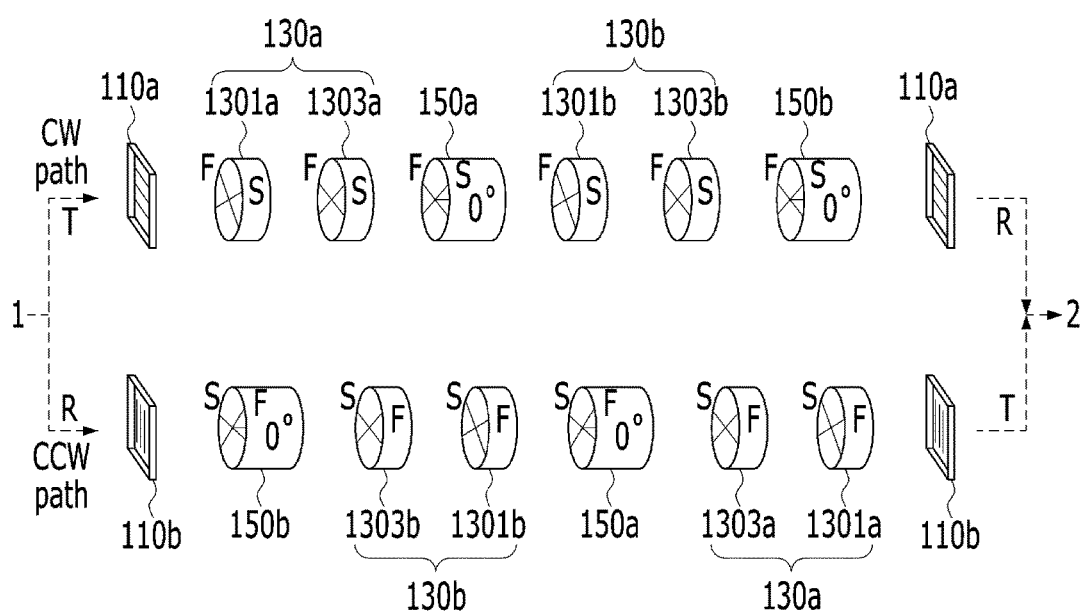
[FIG. 2]

【FIG. 3】
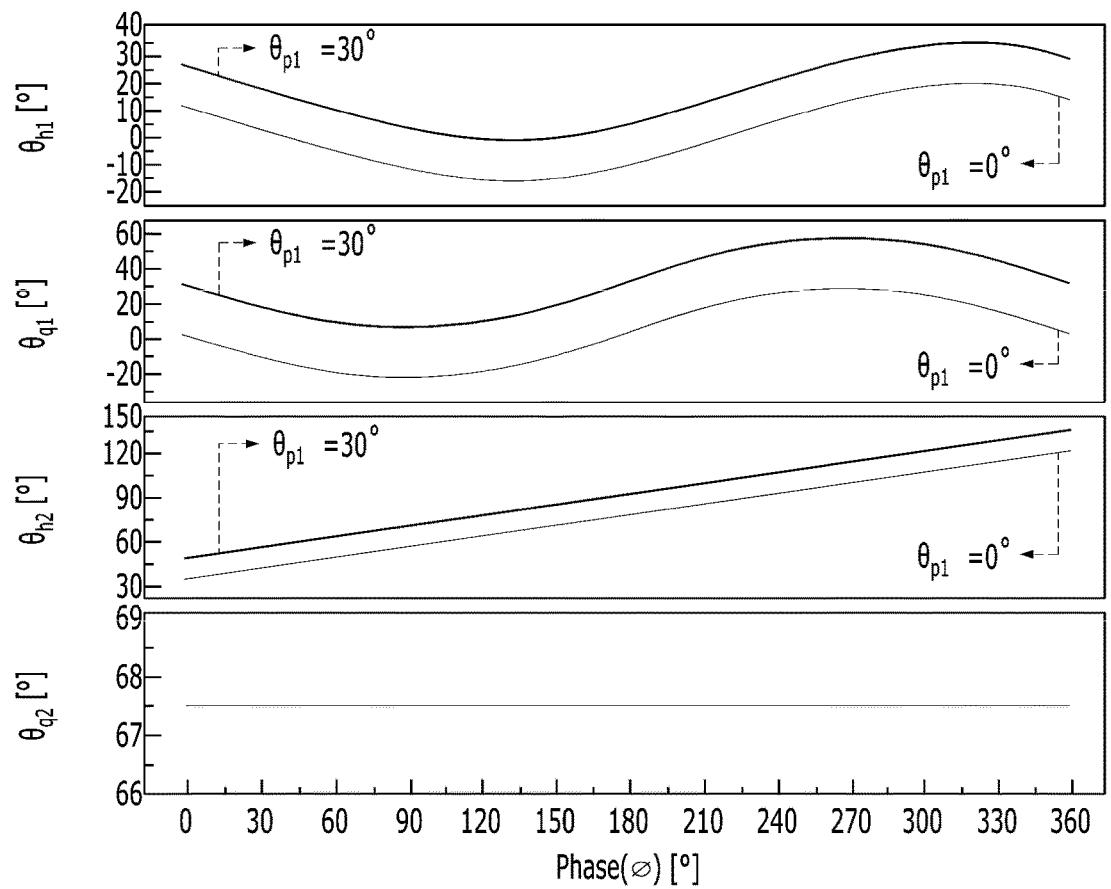

【FIG. 4】
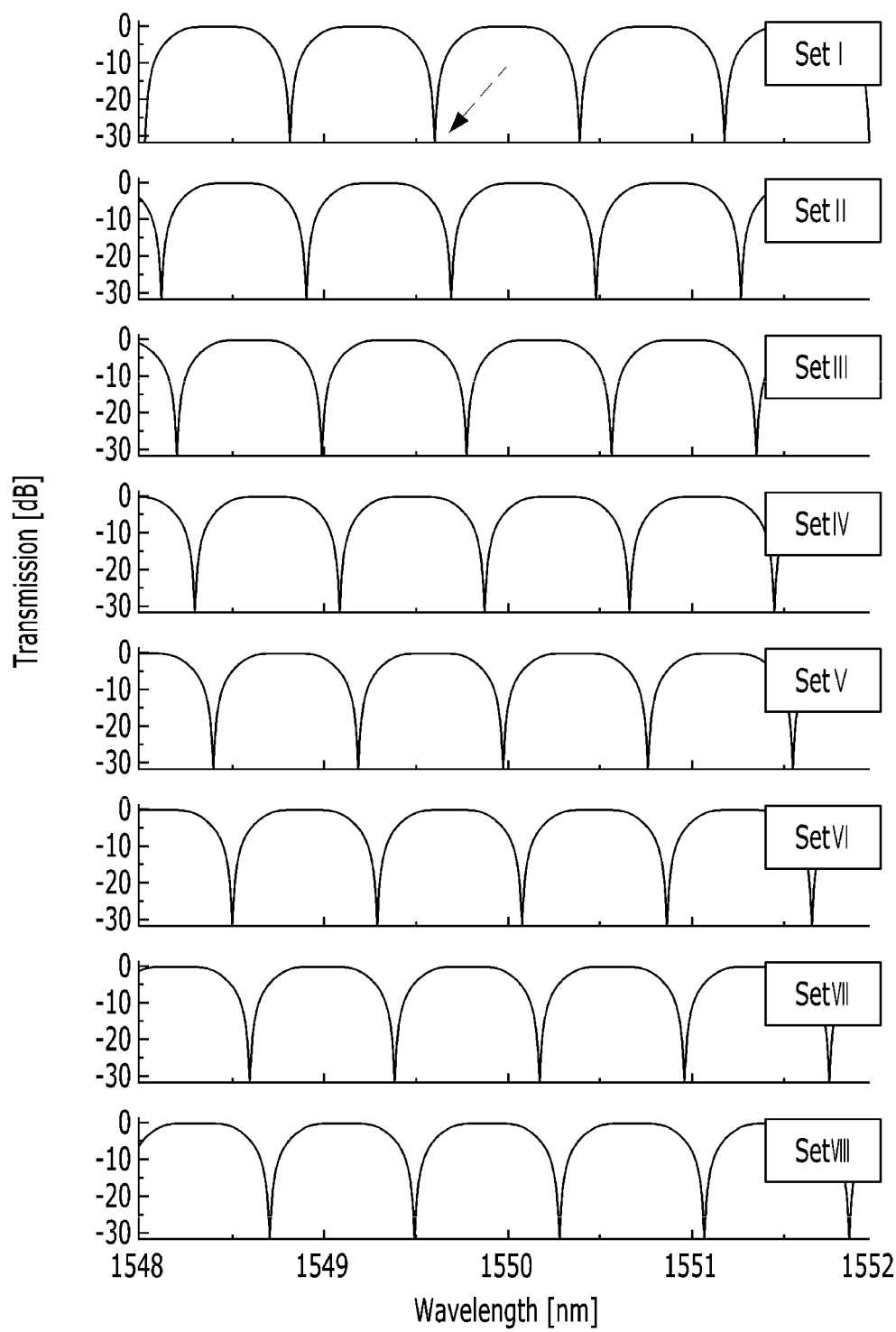

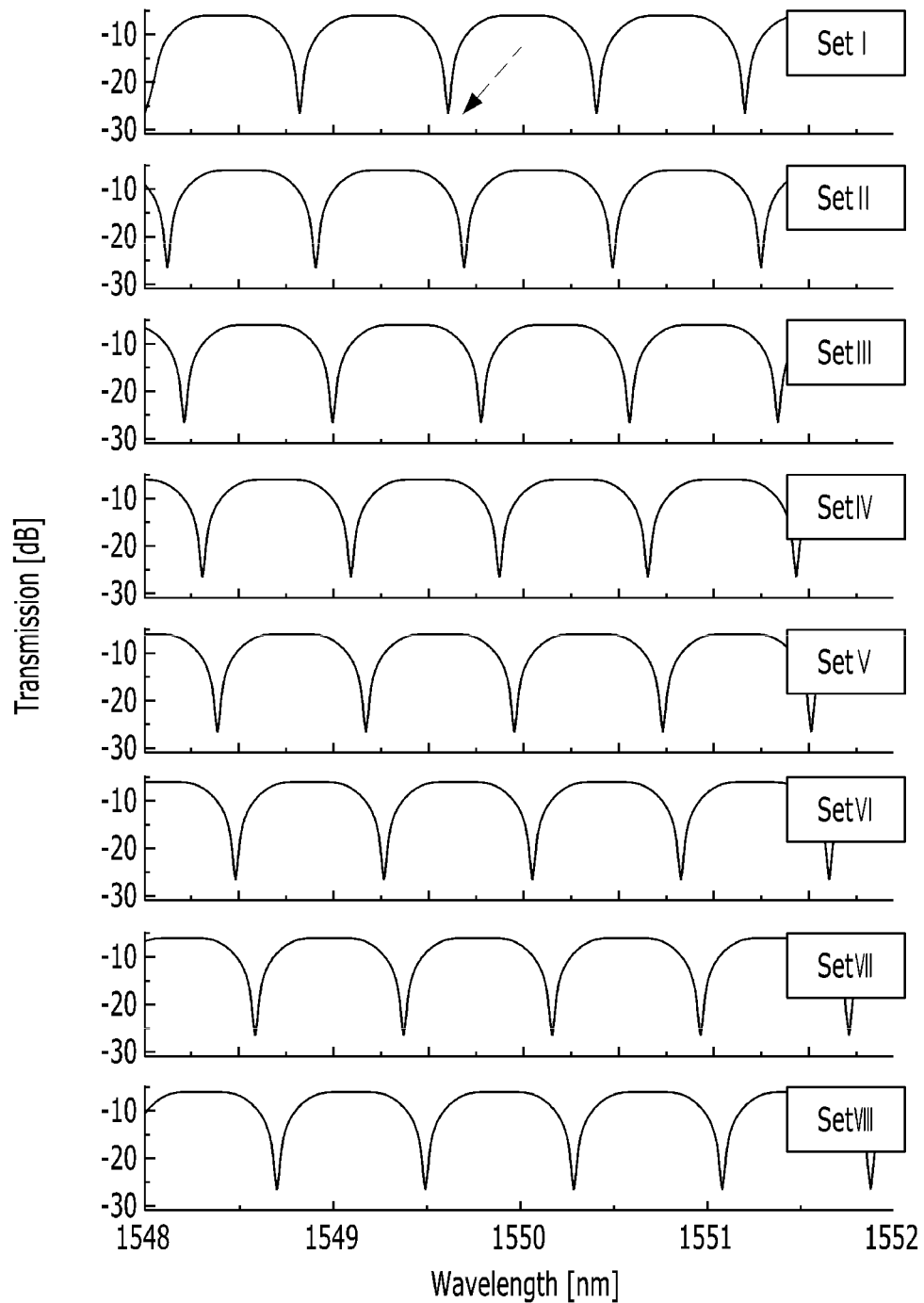
[FIG. 5]

HIGH-ORDER OPTICAL FIBER MULTI-WAVELENGTH FILTER, AND CONTINUOUS WAVELENGTH TUNING METHOD USING THE SAME

This application claims the benefit of Korean Patent Application No. 10-2018-0019590, filed on Feb. 19, 2018, which is hereby incorporated by reference as if fully set forth herein.

BACKGROUND OF THE INVENTION

Field of the Invention

The present disclosure relates to a high-order optical fiber multi-wavelength filter, and a continuous wavelength tuning method using the same, and more particularly, to a high-order optical fiber multi-wavelength filter having two or more birefringent elements (BEs), for continuously tuning the wavelengths of the transmission spectrum of the filter by controlling the azimuth angle of a wave plate, and a continuous wavelength tuning method using the same.

Discussion of the Related Art

Owing to its simple structure, use easiness, and excellent optical fiber compatibility, an optical fiber multi-wavelength filter has been considered as a useful wavelength selection element available for processing an optical signal, and blocking an unnecessary signal causing crosstalk in an optical network.

The optical fiber multi-wavelength filter is applicable to a multi-wavelength optical fiber laser, a microwave photonic filter, and generation of an optical pulse train. The wavelength conversion function of the optical fiber multi-wavelength filter may be useful in selecting an intended wavelength component or preventing interference between wavelength components in a multi-wavelength light source. Research has actively been conducted on a Sagnac birefringence loop (SBL), a Mach-Zehnder interferometer (MZI), a Lyot birefringent filter, a polarization-diversity loop configuration (PDLC), and so on in order to implement a multi-wavelength filter having wavelength variability.

Among them, a PDLC-based multi-wavelength filter configured with a polarization beam splitter (PBS) is much advantageous over an SBL-based multi-wavelength filter in terms of wavelength switching and tuning efficiency of a pass band. Particularly, the PDLC-based multi-wavelength filter is robust against disturbances such as temperature and vibration, compared to an MZI-based filter. Further, unlike the Lyot birefringent filter, the PDLC-based multi-wavelength filter has a transmission spectrum which is not dependent on an input polarization.

In the case of a PDLC-based zero-order multi-wavelength filter using one polarization-maintaining fiber (PMF) as a birefringent element (BE), wavelength tuning of a transmission spectrum may be performed through various combinations of half-wave plates and quarter-wave plates.

Further, transmission characteristics such as a flat-top band or narrowband spectrum may be achieved through a Solc-type PDLC-based first-order multi-wavelength filter in which two PMFs of the same length are concatenated with an angle offset of 45° between their principal axes, and a Lyot-type PDLC-based first-order multi-wavelength filter in which two PMF loops with one PMF loop twice longer than the other PMF loop are concatenated with an angle offset of 60° between their principal axes. Interleaving of flat-top band and narrowband transmission spectrums, that is, half-period switching of a multi-wavelength spectrum may be performed by controlling an angle difference between the principal axes of two PMFs by means of half-wave plates in this PDLC-based first-order multi-wavelength filter.

In general, a high-order optical fiber multi-wavelength filter having two or more BEs may be useful for efficient processing of an optical signal in an optical network system. However, it is difficult to achieve a continuous wavelength tuning function with the high-order optical fiber multi-wavelength filter having two or more BEs.

This is because it is not easy to detect an appropriate combination of wave plates and BEs (i.e., PMFs), and it is very complicated to determine the azimuth angle of each individual optical device.

Therefore, if a high-order optical fiber multi-wavelength filter having two or more BEs is configured by appropriately selecting the types and number of wave plates, and positions of the wave plates relative to BEs, and a wavelength tuning technique for continuous tuning of the wavelengths of a spectrum in the high-order optical fiber multi-wavelength filter is derived, it is expected that this will significantly increase the optical application range and application efficiency of the high-order optical fiber multi-wavelength filter.

SUMMARY OF THE INVENTION

Accordingly, to overcome limitations and disadvantages of the related art, an aspect of the present disclosure is to provide a high-order optical fiber multi-wavelength filter having two or more birefringent elements (BEs) for continuously tuning the wavelengths of a transmission spectrum by controlling the azimuth angle of a wave plate, and a continuous wavelength tuning method using the same.

Another aspect of the present disclosure is to provide a high-order optical fiber multi-wavelength filter for continuously tuning the wavelengths of a transmission spectrum by using two PMF loops and wave plates without an expensive birefringence modulator, thereby reducing cost, and a continuous wavelength tuning method using the same.

Another aspect of the present disclosure is to provide a high-order optical fiber multi-wavelength filter for continuously tuning the wavelengths of a transmission spectrum, thereby being useful in various fields such as microwave and optical signal processing, multi-wavelength laser oscillation, and optical sensor demodulation, and a continuous wavelength tuning method using the same.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a high-order optical fiber multi-wavelength filter includes a polarization beam splitter configured to form a polarization-diversity loop configuration by splitting light received from a broadband light source into two polarization components, combining circulated and input light of the two polarization components, and outputting the combined light, a pair of polarization controllers each including at least one wave plate in combination, and configured to change a polarization state of input light, and a pair of polarization-maintaining fibers configured to form interference spectrums by assigning phase differences through birefringence. The one pair of polarization controllers include a first polarization controller and a second polarization controller, and the one pair of polarization-maintaining fibers include a first polarization-maintaining fiber and a second polarization-maintaining fiber.

In another aspect of the present disclosure, a continuous wavelength tuning method using a high-order optical fiber multi-wavelength filter includes splitting light received from a broadband light source into two polarization components by a polarization beam splitter, changing polarization states of the light split into the two polarization components by a pair of polarization controllers, assigning phase differences to the light having the changed polarization states by a pair of polarization-maintaining fibers, and combining the light having the changed polarization states and the assigned phase differences, and outputting the combined light. The light split into the two polarization components circulates in different directions.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIG. 1 is a schematic view illustrating the structure of a high-order optical fiber multi-wavelength filter according to an embodiment of the present disclosure;

FIG. 2 is a view illustrating light circulation paths in a high-order optical fiber multi-wavelength filter according to an embodiment of the present disclosure;

FIG. 3 is a view illustrating the azimuth angles of wave plates, which may be assigned in a high-order optical fiber multi-wavelength filter according to an embodiment of the present disclosure;

FIG. 4 is a view illustrating a theoretical flat transmission spectrum in a high-order optical fiber multi-wavelength filter according to an embodiment of the present disclosure; and FIG. 5 is a view illustrating a measured flat transmission spectrum in a high-order optical fiber multi-wavelength filter according to an embodiment of the present disclosure.

DETAILED DESCRIPTION OF THE INVENTION

Objects, advantages, and technical structures for achieving them will become apparent upon examination of the following detailed description of embodiments of the present disclosure as well as the attached drawings. In the description of the present disclosure, a detailed description of known functions or configurations will be omitted lest it should obscure the subject matter of the present disclosure. The terms as set forth herein are defined in consideration of the structures, roles, and functions of the present disclosure, and may vary according to the intent of a user and an operator, or customs.

However, the present disclosure is not limited to the disclosed embodiments. Rather, the present disclosure may be implemented in various other ways. The embodiments are provided to make the disclosure of the present disclosure comprehensive and help those skilled in the art to comprehensively understand the scope of the present disclosure, and the present disclosure is defined only by the appended claims. Therefore, the definition should be made based on the overall contents of the specification.

When it is said that a part is "coupled with/to" or "connected to" another part, it should be understood that the one part is connected to the other part "directly" or "indirectly" with any other member in between. Further, when it is said that a part "includes" a component, this means that unless otherwise specified, this means that the part may further include any other component without excluding other components.

According to the present disclosure, in order to continuously tune the wavelengths of a spectrum, a polarization beam splitter (PBS) for implementing a polarization-diversity loop configuration (PDLC), wave plate sets each having a pair of wave plates for controlling the polarization state of light, and a pair of polarization-maintaining fibers (PMFs) are used in a PDLC-based high-order optical fiber multi-wavelength filter having two or more birefringent elements (BEs). Each set of a pair of wave plates may include only quarter-wave plates, and may include a half-wave plate and a quarter-wave plate.

That is, according to the present disclosure, spectrum wavelengths are continuously tuned by appropriately combining wave plates and PMFs in the PDLC-based high-order optical fiber multi-wavelength filter.

A detailed description will be given below of a high-order optical fiber multi-wavelength filter, and a continuous spectrum wavelength tuning method using the same according to an embodiment of the present disclosure, with reference to the attached drawings.

FIG. 1 is a schematic view illustrating the structure of a high-order optical fiber multi-wavelength filter according to an embodiment of the present disclosure.

Referring to FIG. 1, a high-order optical fiber multi-wavelength filter 100, which is based on a PDLC, may include a polarization beam splitter (PBS) 110, a pair of polarization controllers 130a and 130b, and a pair of PMFs 150a and 150b. The PBS 110, the one pair of polarization controllers 130a and 130b, and the one pair of PMFs 150a and 150b may be interconnected by an optical fiber 170.

The PBS 110 includes a first polarizer 110a and a second polarizer 110b in order to split light incident from a broadband light source (not shown) into two polarization beams. The first polarizer 110a and the second polarizer ll0b split the incident light into light of linear horizontal polarization (LHP) and light of linear vertical polarization (LVP) which are mutually orthogonal. For the convenience of description, it is assumed that the horizontal and vertical axes of the PBS 110 are an x axis and a y axis, respectively.

When light travels from a first terminal to a T-th terminal or from an R-th terminal to a second terminal, the first polarizer ll0a is applied, whereas when light travels from the first terminal to the R-th terminal or from the T-th terminal to the second terminal, the second polarizer ll0b is applied. Specifically, the first terminal is connected to the broadband light source and serves as an input of the high-order optical fiber multi-wavelength filter 100, and the R-th terminal is a terminal through which the LVP component of light received via the first terminal is output. On the other hand, the T-th terminal is a terminal through which the LHP component of the light received via the first terminal is output, and the second terminal serves as an output of the high-order optical fiber multi-wavelength filter 100.

That is, the LHP component and the LVP component are output through the T-th terminal and the R-th terminal of the PBS 110 and circulate in a first path running in a clockwise (CW) direction and a second path running in a counter clockwise (CCW) direction, respectively. As such, a PDLC may be implemented by means of the PBS 110.

The one pair of polarization controllers 130a and 130b are provided in the respective paths. The first polarization controller 130a is configured as a first half-wave plate 1301a and a first quarter-wave plate 1303a in combination, and the second polarization controller 130b is configured as a second half-wave plate 1301b and a second quarter-wave plate 1303b in combination, which is merely an embodiment. Thus, the sequence of a half-wave plate and a quarter-wave plate in each polarization controller may be changed, and a polarization controller may be configured only with two quarter-wave plates without a half-wave plate.

This one pair of polarization controllers 130a and 130b change the polarization state of light incident from the broadband light source by controlling the azimuth angle of each wave plate.

Meanwhile, each of the one pair of PMFs 150a and 150b is also provided in one of the paths. The first PMF 150a and the second PMF 150b assign the same phase difference to light traveling in the respective paths.

In general, an interference pattern observed in a polarization interference-based optical fiber multi-wavelength filter is generated by a phase difference between two orthogonal polarization modes of a PMF. This phase difference may be expressed as <Equation 1>.

$$\Gamma = 2\pi BL/\lambda$$ <Equation 1> where $\Gamma$ represents a phase difference, B represents PMF birefringence, L represents a PMF length, and $\lambda$ represents the wavelength of light.

If a phase difference between 0 and $2\pi$ is added to this phase difference, that is, the effective birefringence of the PMF is changed by means of a wave plate, the free spectral range (FSR) and wavelength positions of an interference spectrum may be changed.

Additionally, a third half-wave plate (not shown) may further be interposed between the second PMF 150b and the R-th terminal of the PBS 110. If the third half-wave plate is not further provided, the azimuth angle of the second PMF 150b should be determined in advance. On the contrary, if the third half-wave plate is further provided, even though the azimuth angle of the second PMF 150b has any value, the azimuth angles of the respective wave plates 1301a, 1303a, 1301b, and 1303b of the polarization controllers 130a and 130b capable of continuous wavelength movement may be derived.

FIG. 2 is a view illustrating light circulation paths in a high-order optical fiber multi-wavelength filter according to an embodiment of the present disclosure. Specifically, FIG. 2 illustrates paths in which incident light circulates in the structure of the high-order optical fiber multi-wavelength filter 100 illustrated in FIG. 1.

With reference to FIG. 2, paths in which light incident from a broadband light source circulates will be described in detail. Light incident from the broadband light source via the first terminal of the PBS 110 is output via the T-terminal and the R-terminal, and circulates in the first CW path and the second CCW path, respectively.

First, an LHP component travels from the first terminal to the T-th terminal along the first path, and light passed through the first polarizer ll0a travels sequentially through the first half-wave plate 1301a (slow axis with respect to the x axis and azimuth angle: $\theta_{h1}$), the first quarter-wave plate 1303a (azimuth angle: $\theta_{q1}$), the first PMF 150a (azimuth angle: $\theta_{p1}$), the second half-wave plate 1301b (azimuth angle: $\theta_{h2}$), the second quarter-wave plate 1303b (azimuth angle: $\theta_{q2}$), and the second PMF 150b (azimuth angle: $\theta_{p2}$=22.5°), then from the R-terminal toward the second terminal, and passes through the first polarizer ll0a.

On the other hand, an LVP component travels from the first terminal to the R-th terminal along the second path, and light passed through the second polarizer 110b travels sequentially through the second PMF 150b (azimuth angle: $-\theta_{p2}$=−22.5°), the second quarter-wave plate 1303b (azimuth angle: $-\theta_{q2}$), the second half-wave plate 1301b (azimuth angle: $-\theta_{h2}$), the first PMF 150a (azimuth angle: $-\theta_{p1}$), the first quarter-wave plate 1303a (azimuth angle: $-\theta_{q1}$), and the first half-wave plate 1301a (azimuth angle: $-\theta_{h1}$), then from the T-terminal toward the second terminal, and passes through the second polarizer 110b.

The two pieces of light which have circulated in the first and second paths, respectively are combined again in the PBS 110 and output via the second terminal.

In FIG. 2, F and S represent the fast axes and slow axes of the wave plates and BEs such as the PMFs, respectively. Although interference spectrums having the same FSR are generated in both of the first and second paths due to polarization interference, the insertion loss of each interference spectrum is determined by an input polarization. Since the polarizations of two pieces of light traveling in the two paths are mutually orthogonal, the output spectrum of the high-order optical fiber multi-wavelength filter is obtained by the algebraic sum of these two interference spectrums.

Particularly, any input polarization may be expressed as the linear superposition of an LHP component and an LVP component, and thus the output spectrum of the high-order optical fiber multi-wavelength filter is not related to the input polarization.

FIG. 3 is a view illustrating the azimuth angles of wave plates, which may be assigned for continuous tuning of the wavelengths of a spectrum in a high-order optical fiber multi-wavelength filter according to an embodiment of the present disclosure.

FIG. 3 illustrates the values of $\theta_{h1}$, $\theta_{q1}$, $\theta_{h2}$, and $\theta_{q2}$ required to change an additional phase difference $\varphi$ assigned to a transmission spectrum to 0° to 360° in the case where the azimuth angle $\theta_{p1}$ of the first PMF 150a in the pair of PMFs is 0° or 30°.

Meanwhile, the azimuth angle $\theta_{p2}$ of the second PMF 150b is fixed to 22.5°.

Referring to FIG. 3, it may be noted that for any additional phase difference $\varphi$ between 0° and 360°, there are also azimuth angles $\theta_{h1}$, $\theta_{q1}$, $\theta_{h2}$, and $\theta_{q2}$ of the four wave plates, and the wavelengths of a transmission spectrum may be shifted to any position by means of a combination of the azimuth angles of the wave plates.

The high-order optical fiber multi-wavelength filter according to the present disclosure may shift the wavelengths of a high-order transmission spectrum by assigning an additional phase difference $\varphi$ to an original phase difference $\Gamma$. That is, the additional phase difference $\varphi$ should be added to the phase difference $\Gamma$ of each PMF in order to tune the wavelengths of the transmission spectrum. For example, in order to tune the wavelengths of a flat transmission spectrum, the effective phase difference of each PMF should be $\Gamma+\varphi$. The effective azimuth angles of the first and second PMFs required to achieve a flat transmission spectrum are −22.5° and 22.5°, respectively. The effective phase differences and effective azimuth angles of the first and second PMFs may be set by changing the polarization state of input light. The polarization state of the input light may be set by a polarization controller, and a change of the additional phase difference $\varphi$ to 0 to $2\pi$, that is, 0° to 360° results in a shift of the flat-top band multi-wavelength transmission spectrum by one FSR in a wavelength region. That is, the transmission spectrum may be shifted fully by one channel spacing.

FIG. 4 is a view illustrating a theoretical flat transmission spectrum in a high-order optical fiber multi-wavelength filter according to an embodiment of the present disclosure, and FIG. 5 is a view illustrating a measured flat transmission spectrum in a high-order optical fiber multi-wavelength filter according to an embodiment of the present disclosure. FIGS. 4 and 5 illustrate a theoretical flat transmission spectrum and an empirical flat transmission spectrum, respectively, in the cases where $\varphi$ is 0 (Set I), 45° (Set II), 90° (Set III), 135° (Set IV), 225° (Set VI), 270° (Set VII), and 315° (Set VIII) among the combinations of the azimuth angles of the wave plates achieved in FIG. 3.

FIG. 4, that is, an analysis of the theoretical flat transmission spectrum reveals that the wavelengths of the flat transmission spectrum may be continuously tuned, and FIG. 5, that is, a measurement result of an actually fabricated high-order optical fiber multi-wavelength filter reveals that the wavelengths of the flat transmission spectrum may be continuously tuned by the proposed wavelength tuning method.

Therefore, the high-order optical fiber multi-wavelength filter according to the present disclosure may continuously tune the wavelengths of an output spectrum by controlling the wave plates so that the additional phase difference $\varphi$ added to each of phase differences assigned by the two PMFs 150a and 150b may be equal.

As is apparent from the foregoing description, according to the present disclosure, the wavelengths of a spectrum can be tuned continuously by controlling the azimuth angles of wave plates in a high-order optical fiber multi-wavelength filter having two or more BEs.

Further, according to the present disclosure, since the wavelengths of a spectrum can be tuned continuously by using two PMF loops and wave plates without an expensive birefringence modulator, cost can be saved.

Further, according to the present disclosure, as the wavelengths of a spectrum of a high-order optical fiber multi-wavelength filter can be tuned continuously, the high-order optical fiber multi-wavelength filter can be useful in various fields including microwave and optical signal processing, multi-wavelength laser oscillation, and optical sensor demodulation.

It will be apparent to those skilled in the art that various modifications and variations can be made in the present disclosure without departing from the spirit or scope of the present disclosure. Thus, it is intended that the present disclosure covers the modifications and variations of this present disclosure provided they come within the scope of the appended claims and their equivalents.

What is claimed is:

1. A high-order optical fiber multi-wavelength filter comprising:
a polarization beam splitter configured to form a polarization-diversity loop configuration by splitting light received from a broadband light source into two polarization components, combining circulated and input light of the two polarization components, and outputting the combined light;
a pair of polarization controllers each including at least one wave plate in combination, and configured to change a polarization state of input light;
a pair of polarization-maintaining fibers configured to form interference spectrums by assigning phase differences through birefringence,
wherein the one pair of polarization controllers include a first polarization controller and a second polarization controller, and the one pair of polarization-maintaining fibers include a first polarization-maintaining fiber and a second polarization-maintaining fiber; and
a first and a second paths for a light circulation,
the first path consisting of the polarization beam splitter, the first polarization controller, the first polarization-maintaining fiber, the second polarization controller, the second polarization-maintaining fiber, and the polarization beam splitter, which are arranged in such order, and
the second path consisting of the polarization beam splitter, the second polarization-maintaining fiber, the second polarization controller, the first polarization-maintaining fiber, the first polarization controller, and the polarization beam splitter, which are arranged in such order,
wherein each of the first and the second polarization controllers includes at least one of a first sequence of a half-wave plate and a quarter-wave plate, a second sequence of the quarter-wave plate and the half-wave plate, and a third sequence of the quarter-wave plate and the quarter-wave plate.

2. The high-order optical fiber multi-wavelength filter according to claim 1, wherein each of the first polarization controller and the second polarization controller comprises two quarter-wave plates, and changes a polarization state by controlling azimuth angles of the two quarter-wave plates.

3. The high-order optical fiber multi-wavelength filter according to claim 1, wherein each of the first polarization controller and the second polarization controller comprises a half-wave plate and a quarter-wave plate, and changes a polarization state by controlling azimuth angles of the half-wave plate and the quarter-wave plate.

4. The high-order optical fiber multi-wavelength filter according to claim 1, wherein effective birefringence of the first polarization-maintaining fiber is set by changing a polarization state in the first polarization controller, and effective birefringence of the second polarization-maintaining fiber is set by changing a polarization state in the second polarization controller.

5. A continuous wavelength tuning method using a high-order optical fiber multi-wavelength filter, the method comprising:
splitting light received from a broadband light source into two polarization components by a polarization beam splitter;
changing polarization states of the light split into the two polarization components by a pair of polarization controllers having a first polarization controller and a second polarization controller;
assigning phase differences to the light having the changed polarization states by a pair of polarization-maintaining fibers having a first polarization-maintaining fiber and a second polarization-maintaining fiber; and
combining the light having the changed polarization states and the assigned phase differences, and outputting the combined light,
wherein the light split into the two polarization components circulates via a first and a second paths,
the first path arranged in order of the polarization beam splitter, the first polarization controller, the first polarization-maintaining fiber, the second polarization controller, the second polarization-maintaining fiber, and the polarization beam splitter, and the second path arranged in order of the polarization beam splitter, the second polarization-maintaining fiber, the second polarization controller, the first polarization-maintaining fiber, the first polarization controller, and the polarization beam splitter, wherein each of the first and the second polarization controllers includes at least one of a first sequence of a half-wave plate and a quarter-wave plate, a second sequence of the quarter-wave plate and the half-wave plate, and a third sequence of the quarter-wave plate and the quarter-wave plate.

6. The continuous wavelength tuning method according to claim 5, wherein effective birefringence of the one pair of polarization-maintaining fibers are set by changing polarization states in the one pair of polarization controllers.

* * * * *